(12) United States Patent
Maruyama et al.

(10) Patent No.: US 7,056,423 B2
(45) Date of Patent: *Jun. 6, 2006

(54) APPARATUS FOR PRODUCING HYDROGEN, ELECTROCHEMICAL DEVICE, METHOD FOR PRODUCING HYDROGEN AND METHOD FOR GENERATING ELECTROCHEMICAL ENERGY

(75) Inventors: Ryuichiro Maruyama, Kanagawa (JP); Hiroshi Miyazawa, Kanagawa (JP); Hirofumi Okui, Saitama (JP); Koichiro Hinokuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 342 days.

This patent is subject to a terminal disclaimer.

(21) Appl. No.: 10/204,383

(22) PCT Filed: Dec. 20, 2001

(86) PCT No.: PCT/JP01/11196

§ 371 (c)(1),
(2), (4) Date: Aug. 20, 2002

(87) PCT Pub. No.: WO02/50338

PCT Pub. Date: Jun. 27, 2002

(65) Prior Publication Data

US 2003/0116443 A1     Jun. 26, 2003

(30) Foreign Application Priority Data

Dec. 20, 2000  (JP)  .............. 2000-386173

(51) Int. Cl.
  *C25B 1/02*  (2006.01)
  *C25B 9/00*  (2006.01)
  *H01M 8/02*  (2006.01)
(52) U.S. Cl. .............. 204/252; 205/637; 429/17
(58) Field of Classification Search .............. 204/252; 205/637

See application file for complete search history.

(56) References Cited

U.S. PATENT DOCUMENTS

| | | | |
|---|---|---|---|
| 5,855,748 A * | 1/1999 | Law et al. ................. 204/252 |
| 6,368,492 B1 * | 4/2002 | Narayanan et al. ......... 205/638 |
| 6,495,290 B1 * | 12/2002 | Hinokuma et al. ...... 429/231.8 |

FOREIGN PATENT DOCUMENTS

| | | |
|---|---|---|
| EP | 0920065 | 6/1999 |
| EP | 1 071 149 A2 | 1/2001 |
| JP | 05-270801 | 10/1993 |
| JP | 11-31515 | 2/1999 |
| JP | 11-217688 | 8/1999 |

* cited by examiner (Continued)

Primary Examiner—Roy King
Assistant Examiner—William T. Leader
(74) Attorney, Agent, or Firm—Sonnenschein Nath & Rosenthal LLP

(57) ABSTRACT

The invention provides an apparatus for producing hydrogen and a method for producing hydrogen which effectively produce hydrogen in the low humidity atmosphere without humidifier or dehumidifier, and an electrochemistry device and a method for generating electrochemistry energy which generate electrochemistry energy by an oxidation-reduction reaction using hydrogen. A fullerene derivative where a proton ($H^+$) dissociating group is introduced into a fullerene, is used as a composition material of a proton conductor 3, water is supplied to an anode 1 in a vapor or gas state and is electrolyzed, and produced protons ($H^+$) are conducted to a cathode 2 through the proton conductor 3 and converted into hydrogen here. Moreover, hydrogen produced in such a way is decomposed into protons ($H^+$) at the cathode 2, the protons are conducted to the anode 1 through the proton conductor 3 and converted into water there, and then, electrochemistry energy is extracted between the cathode 2 and the anode 1.

31 Claims, 16 Drawing Sheets

CUBIC DIAMOND

HEXAGONAL DIAMOND

6H-TYPE DIAMOND

HEXAGONAL DIAMOND

DIAMOND

APPARATUS FOR PRODUCING HYDROGEN, ELECTROCHEMICAL DEVICE, METHOD FOR PRODUCING HYDROGEN AND METHOD FOR GENERATING ELECTROCHEMICAL ENERGY

TECHNICAL FIELD

The invention relates to an apparatus for producing hydrogen, an electrochemistry device, a method for producing hydrogen, and a method for generating electrochemistry energy.

BACKGROUND OF THE INVENTION

Research of new energy is directed at solving energy problems in recent years. Particularly, hydrogen energy has features such as an inexhaustible supply, pollution-free, and high thermal efficiency, and many researchers have investigated various leading candidates for future new energy.

The methods of producing hydrogen are classified into two kinds. One method is to decompose water to produce hydrogen and oxygen using electric power, sunlight, nuclear heat, or the like, and the another method is to extract hydrogen by the thermal reforming using a natural gas as a raw material. There are problems of discharging carbon dioxide in the producing process, using fossil fuel, and the like, in the latter method for producing hydrogen, and the former method for producing hydrogen using water electrolysis utilizing the electric power, the sunlight, the nuclear heat, or the like, is indispensable to construction of a clean energy system.

Traditionally, producing hydrogen is performed by water electrolysis using a low-temperature solid electrolyte film such as a perfluorosulfonic acid resin. The perfluorosulfonic acid resin can include Nafion 117 (hereinafter is named simply as Nafion) from DuPont, for example.

FIG. 16 is a sectional view showing an outline of a conventional apparatus of producing hydrogen. In the apparatus, Nafion 103 is located between an anode 101 and a cathode 102 which are placed in the opposite direction, and the following chemical reactions occur at the anode 101 and the cathode 102 respectively.

Anode: 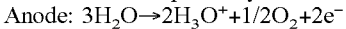
Cathode: 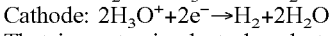

That is, water is electrolyzed at the anode 101 to give $H_3O^+$ ions, the $H_3O^+$ ions are conducted from the anode 101 to the cathode 102 through the Nafion 103, and hydrogen is generated from the $H_3O^+$ ions at the cathode 102.

There are the following problems in such apparatus for producing hydrogen.

First, the Nafion 103 is an $H_3O^+$ ion conductor, and the conductivity is not maintained in the low humidity atmosphere. Rather, it functions under the existence of a lot of water. Then, it becomes indispensable to be equipped with a humidifier on the side of the anode 101 where the $H_3O^+$ ions are produced, so that the Nafion 103 may to fully include moisture.

Furthermore, it takes long time to start a steady operation, because the initial stage of the electrolysis requires a supply of water vapor sufficient to allow the Nafion 103 to function.

Moreover, the above method for producing hydrogen generates water with hydrogen. For this reason, a dehumidifier is indispensable on the cathode 102 side.

The present invention has been achieved to solve the above problems. It is an object of the invention to provide an apparatus for producing hydrogen and a method for producing hydrogen which effectively produce hydrogen in the low humidity atmosphere with no humidifier nor dehumidifier, and an electrochemistry device and a method for generating electrochemistry energy which generates electrochemistry energy by an oxidation-reduction reaction using hydrogen.

SUMMARY OF THE INVENTION

An apparatus for producing hydrogen of the invention comprises a proton conductor which is located between an anode and a cathode and has a structure containing a carbon material that is at least one kind selected from the group consisting of fullerenes, carbon clusters, and linear carbon structures where a proton ($H^+$) dissociating group is introduced into at least a part of carbon atoms.

Moreover, a method for producing hydrogen of the invention is to supply water in a gaseous state or a vapor state from at least one surface of an anode, electrolyze water at the anode to produce protons ($H^+$), conduct the protons ($H^+$) from the anode to a cathode through a proton conductor, and convert the protons ($H^+$) into hydrogen at the cathode, using the apparatus for producing hydrogen of the invention.

Furthermore, an electrochemistry device of the invention comprises a proton conductor which is located between an anode and a cathode and has a structure containing a carbon material that is at least one kind selected from the group consisting of fullerenes, carbon clusters, and linear carbon structure where a proton ($H^+$) dissociating group is introduced into at least a part of the carbon atoms.

Furthermore, a method for generating electrochemistry energy of the invention comprises the steps of: supplying water in a gaseous state or a vapor state from at least one surface of an anode, electrolyzing water at the anode to produce protons ($H^+$), conducting the protons ($H^+$) from the anode to a cathode through a proton conductor, and generating hydrogen from the protons ($H^+$) at the cathode; and decomposing hydrogen at the cathode to produce protons ($H^+$), conducting the protons ($H^+$) from the cathode to the anode through the proton conductor, and producing water from the protons ($H^+$) at the anode, using the apparatus for producing hydrogen of the invention.

The "proton ($H^+$) dissociating group" in the invention means a functional group which can release a proton by ionization, and the "proton ($H^+$) dissociation" means that a proton separates from the group by the ionization.

According to the apparatus for producing hydrogen and the method for producing hydrogen of the invention, the proton conductor, which has a carbon material that is at least one kind selected from the group consisting of fullerenes, carbon clusters, and linear carbon structures where a proton ($H^+$) dissociating group is introduced into at least some of the carbon atoms, is located between both poles as an electrolyte, and hydrogen ($H_2$) is generated from the protons ($H^+$) which are conducted from the anode to the cathode through the proton conductor functioning even in a low humidity atmosphere.

According to the electrochemistry device and the method for generating electrochemistry energy of the invention, the proton conductor, which has a structure containing a carbon material that is at least one kind selected from the group consisting of fullerenes, carbon clusters, and linear carbon structures where a proton ($H^+$) dissociating group is introduced into at least some of the carbon atoms, is located between both poles as an electrolyte, hydrogen ($H_2$) is generated from the protons ($H^+$) which are conducted from the anode to the cathode through the proton conductor which functioning even in a low humidity atmosphere, and water ($H_2O$) is generated from the protons ($H^+$) which are conducted from the cathode to the anode.

Other and further objects, features and advantages of the invention will appear more fully from the following description.

DETAILED DESCRIPTION OF THE PRESENTLY PREFERRED EMBODIMENTS

The invention will be described below more in detail based on embodiments.

Figure 1:
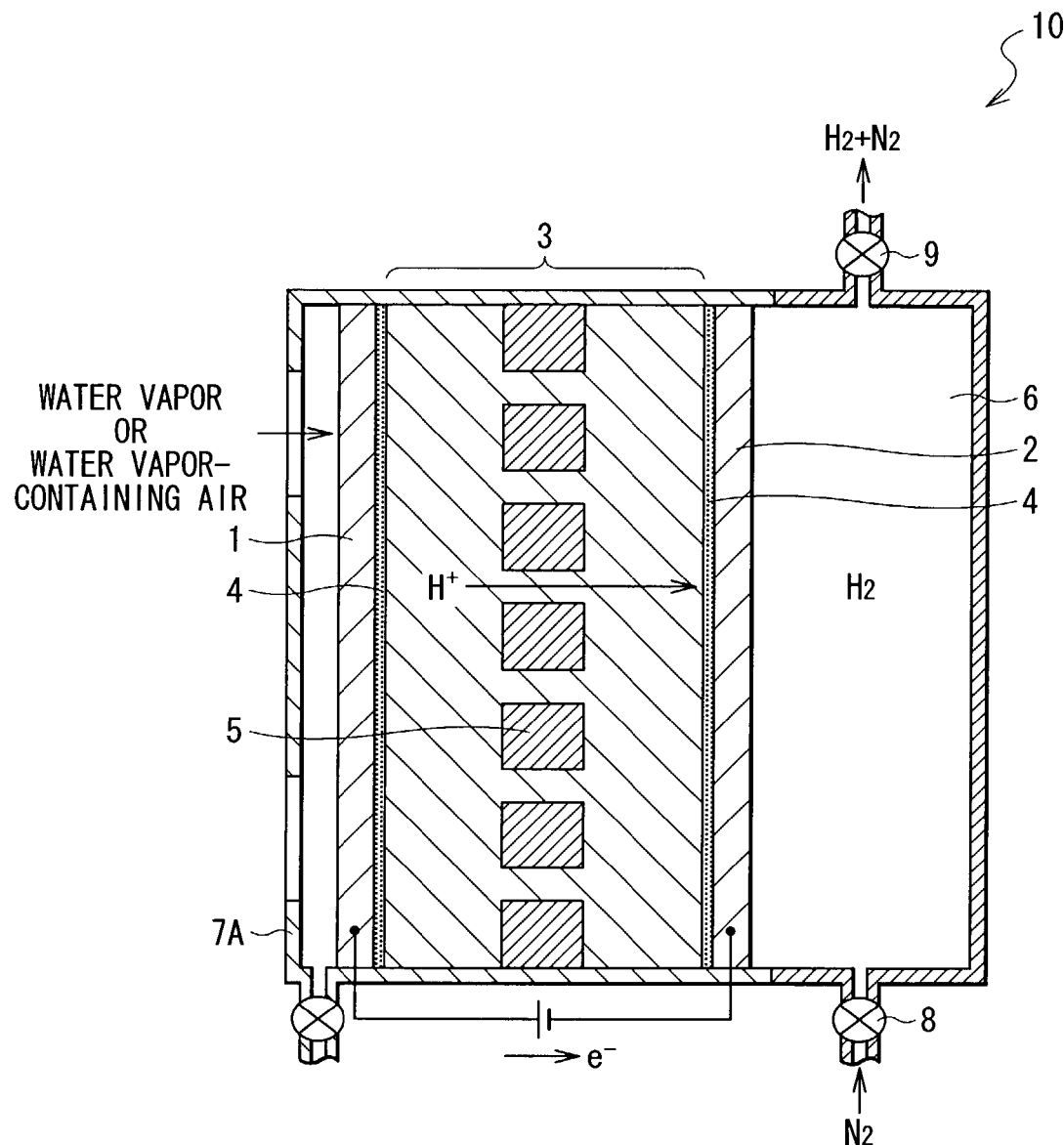
FIG. 1 is a sectional view showing an apparatus for producing hydrogen according to an embodiment of the invention.
Figure 2:
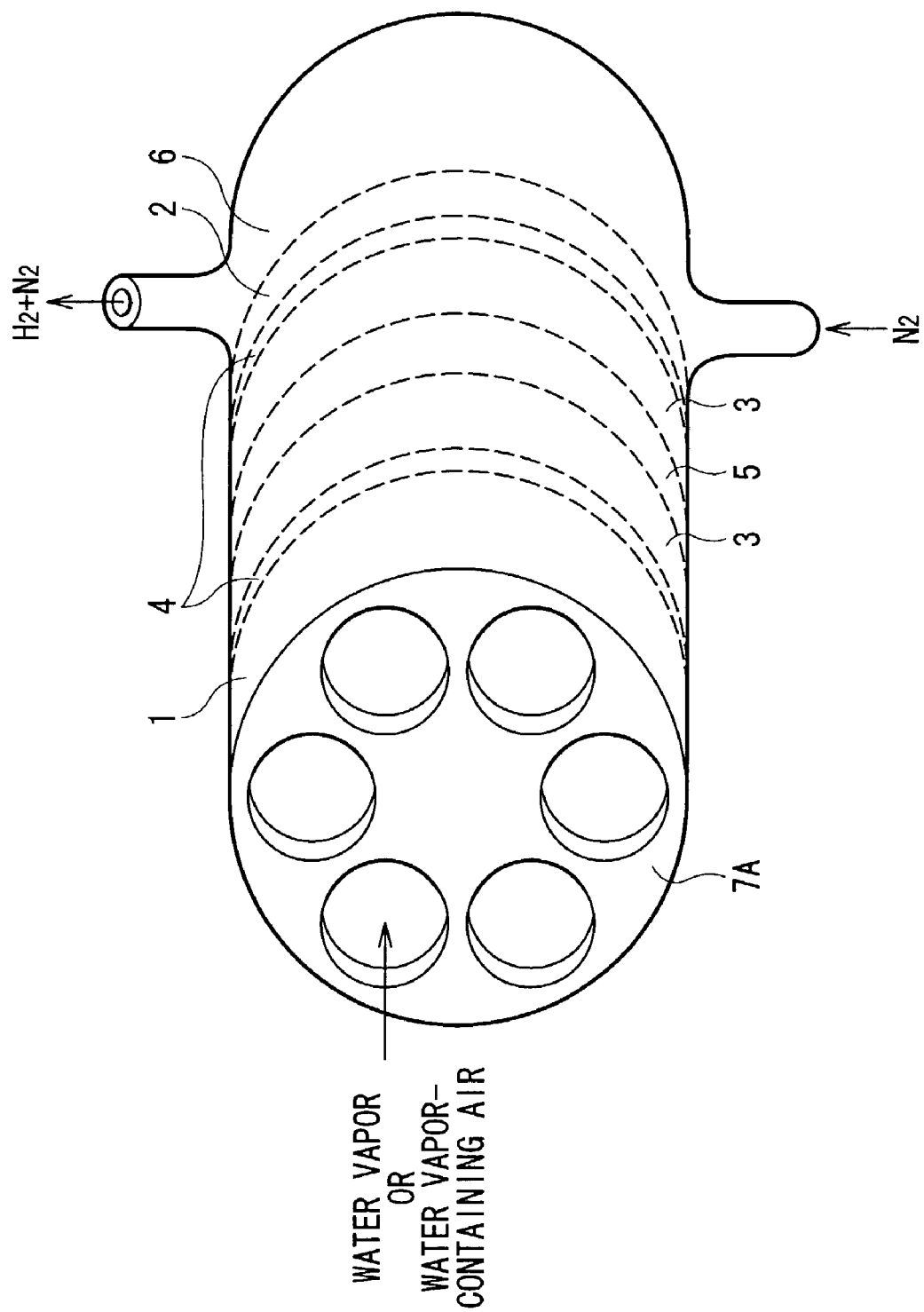
FIG. 2 is a perspective view of the apparatus for producing hydrogen shown in FIG. 1.

FIG. 1 is a configuration diagram showing a sectional construction of an apparatus for producing hydrogen according to an embodiment of the invention, and FIG. 2 is a general view thereof. The apparatus for producing hydrogen 10 has a structure where a proton conductor 3 is located between an anode 1 and a cathode 2 which are placed in the opposite direction, and water is electrolyzed at the anode 1 to generate protons ($H^+$), the generated protons ($H^+$) are conducted to the cathode 2 through the proton conductor 3, and hydrogen is generated from the protons ($H^+$) at the cathode 2, by supplying water in a gaseous state or a vapor state from a surface of the anode 1 being on the far side from the proton conductor 3 in a state of voltage applied between the anode 1 and the cathode 2.

These elements, that is, the anode 1, the proton conductor 3, and the cathode 2, are multilayered in this order and formed into a MEA (Membrane & Electroassembly). Thus, it is preferable that both electrodes 1 and 2 and the proton conductor 3 are placed to be integrated or contact, and have a shape of a flexible sheet but have sufficient strength from a viewpoint of handling or enlargement thereof.

In order to obtain a low electrolytic voltage, the anode 1 and the cathode 2 among these elements, are preferably an active electrode with sufficiently low hydrogen generating potential. Moreover, they have preferably plasticity and a surface area enough to contact the proton conductor 3, as well as heat resisting properties, and for example, they are made of an electrode material such as porous or a mesh shape.

Moreover, at least either of the anode 1 or the cathode 2 and the proton conductor 3 are preferably located to sandwich a catalyst layer, and here, both electrodes 1 and 2, and the proton conductor 3 are respectively located to sandwich the catalyst layers 4. Thereby, the efficiency of water electrolysis can be improved and the efficiency of hydrogen generation can be improved more.

Specifically, the electrodes 1 and 2 and the catalyst layers 4 are formed by preparing a sheet-like carbon fiber, porous carbon, or the like and applying an active catalyst to an surface thereof to be contacted to the proton conductor 3.

As a material of the catalyst layers 4, for example, particles of platinum, ruthenium, or oxidation iridium are desirable, and other electrode substances such as silver may be preferable as long as the reaction at each of the above electrodes 1 and 2 is promoted.

The formation of the catalyst layers 4 on one surface of each of the electrodes 1 and 2 can be performed by usual methods. For example, it may be performed by applying a catalyst or a precursor thereof to surfaces of carbon powder, processing the powder by the heating treatment or the like to form catalyst grains, and baking and applying the grains and a fluororesin over the surface of each of the electrodes 1 and 2. Alternatively, the catalyst layers 4, for example, made of an alloy of platinum and ruthenium may be respectively formed on the surfaces of electrodes 1 and 2 by applying the precursor of the catalyst, for example, a mixed aqueous solution of chloroplatinic acid and chlororuthenic acid, or a butyl alcohol solution over the surface of each of the electrodes 1 and 2, and then baking them in the reduction atmosphere containing hydrogen at a temperature of 200° C.–350° C.

Moreover, a metal net member made by knitting metal lines may be inserted into or applied on the sheet-like electrodes 1 and 2 as a core material. In this case, the conductivity of the electrodes themselves is improved and a uniform current distribution can be expected over the whole surfaces.

The proton conductor 3 is a conduction medium of protons ($H^+$) and has a structure containing a derivative where an essential part is at least one kind selected from the group consisting of fullerenes, carbon clusters, and linear carbon structures and a proton ($H^+$) dissociating group is introduced into carbon atom thereof.

First, the case of a proton conductor 3 with a structure containing a fullerene derivative will be described.

Here, while the fullerene which serves as an essential part of the derivative is not especially be limited to a spherical-shell-like cluster, a simple substance fullerene selected from $C_{36}$, $C_{60}$, $C_{70}$, $C_{76}$, $C_{78}$, $C_{80}$, $C_{82}$, $C_{84}$, or a mixture of two or more kinds among these is preferably used in general.

These fullerenes have been discovered in the mass analysis spectrum of the cluster beam using the carbonaceous laser ablation in 1985 (Kroto, H. W.; Heath, J. R.; O'Brien, S. C.; Curl, R. F.; Smalley, and R. E. Nature 1985.318,162.). It is five years later that the manufacture method thereof was actually established, and the manufacturing method by the carbon electrode arc discharge process was found out in 1990, and the fullerene has attracted attention as a carbon semiconductor material or the like since then.

Figure 4A:
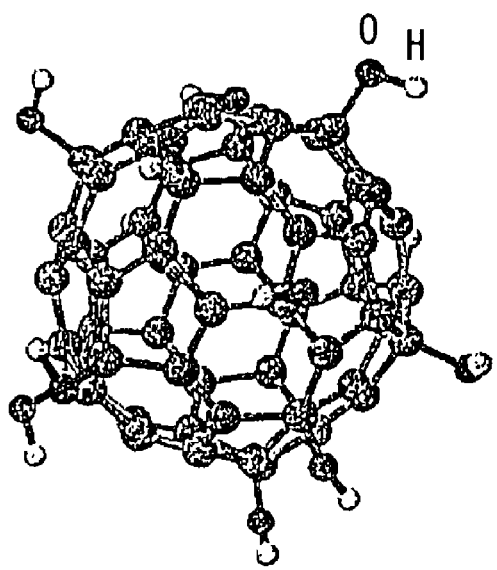
FIGS. 4A and 4B are structural views of polyhydroxyl fullerene which is one of the fullerene derivatives used for a proton conductor according to an embodiment of the invention.
Figure 4A:
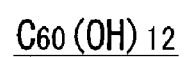
Figure 4B:
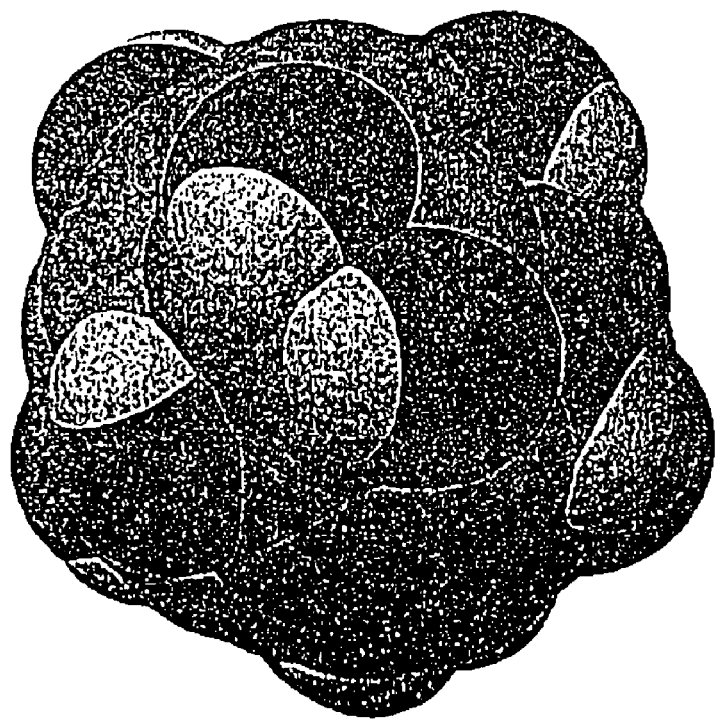

FIGS. 4A and 4B show a structure of fullerenol given by the introduction of multiple hydroxyl groups (OH groups) into the fullerene. As for the fullerenol, the example of the synthesis thereof was first reported by Chiang et. al. in 1992 (Chiang, L. Y.; Swirczewski, J. W.; Hsu, C. S.; Chowdhury, S. K.; Cameron, S.; Creegan, K., J. Chem. Soc, Chem. Commun. 1992, 1791).

Figure 5A:
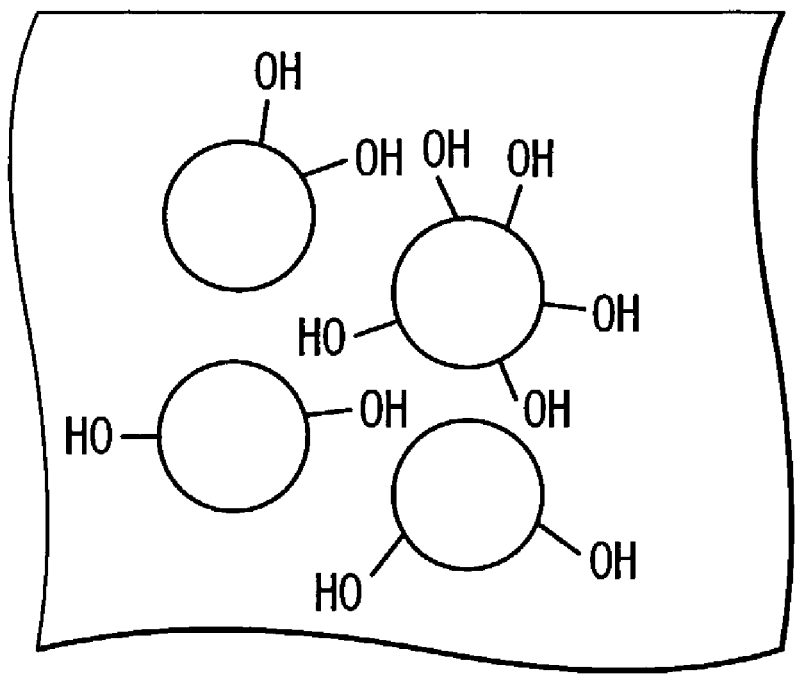
FIGS. 5A and 5B are model diagrams showing an existence form of a fullerene derivative used for a proton conductor according to an embodiment of the invention.

The applicants has found for the first time that when the fullerenol is shaped into an aggregation shown schematically in FIG. 5A (wherein circles shown in the figures represent fullerene) and interacts with hydroxyl groups which are mutually close to the fullerenol, the aggregation demonstrate high proton conductivity (in other words, a $H^+$ dissociating ability from a phenol hydroxyl group) as a macroscopic aggregate.

Figure 5B:
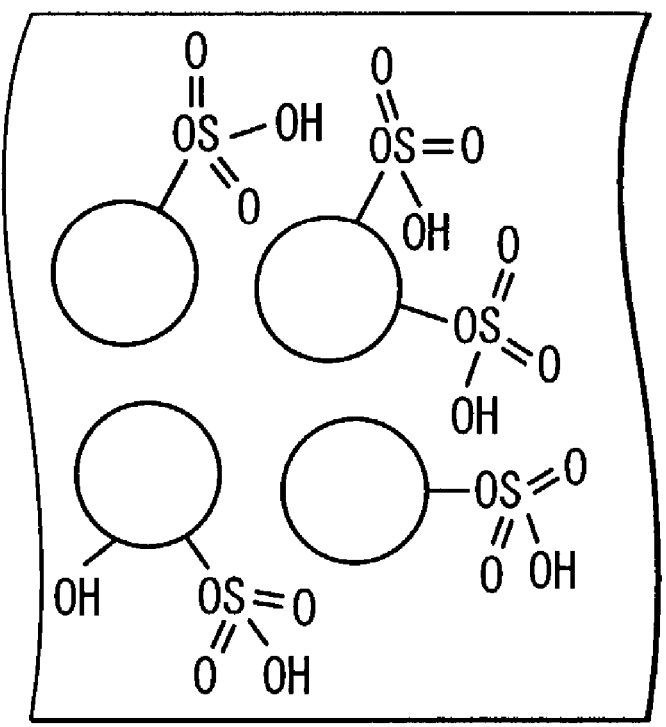

The fullerene derivatives which can exhibit the proton conductivity with the same mechanism can include fullerene derivatives which $OSO_3H$ groups instead of the OH groups are introduced into: polyhydroxyl fullerenes, i.e., sulfuric ester fullerenols as shown in FIG. 5B, which has been reported also by Chiang et al. in 1994 (Chiang. L. Y.; Wang, L. Y.; Swirczewski, J. W.; Soled, S.; Cameron, S., and J. Org. Chem. 1994, 59, 3960). The sulfuric ester fullerenols include those only containing $OSO_3H$ groups and those containing both $OSO_3H$ and OH groups, in one molecule.

It should be noticed that any fullerene derivatives which can represent the proton conductivity, may be composition materials of the proton conductor 3, and the introduced groups are not especially limited only to OH group and $OSO_3H$ group.

That is, the dissociating groups introduced into the fullerene are expressed as —XH, and X may express any atom or atomic group which has divalent valence number. Furthermore, the groups are expressed as —OH or —YOH, and Y may express any atom or atomic group which has divalent valence number.

Specifically, —COOH, —$SO_3H$, or —$OPO(OH)_2$ is preferable in addition to —OH and $OSO_3H$ described above.

In the fullerene derivatives represented by these fullerenols and the sulfuric ester fullerenols, quite many functional groups such as OH groups and $OSO_3H$ groups can be introduced into one molecular of the fullerene which is the essential part, so significantly hydrogen ion density per unit volume increases, and efficient conductivity is represented, when large quantity thereof are aggregated.

Moreover, in these fullerenes derivatives, the good proton conductivity can be kept continuously, even if it is in the low humidity atmosphere, because the hydrogen ions ($H^+$) derived from the OH groups, the $OSO_3H$ groups, and the like directly concern with the proton conduction.

Furthermore, the fullerene itself has electrophilicity, so it is thought that ionization of the hydrogen ions is promoted also not only in the $OSO_3H$ groups with high acidity but in OH groups of the derivatives thereof, and that the proton conductivity is still higher.

These fullerene derivatives weigh light, are less subject to deteriorate, and contain no pollutant, since the most of them constituted of carbon atoms of the fullerene. The manufacturing costs of the fullerenes are also being reduced rapidly. Therefore, it can be said that the fullerenes not only have excellent material properties, but also are ideal electrolyte materials which are superior to any other materials even from the viewpoint of resources, economy, and the environment.

These fullerene derivatives which can be used for the embodiment are synthesized by treating the powder of the fullerene using an appropriate combination of the well-known processing such as the acid treatment and hydrolysis to introduce desired functional groups into the carbon atoms of the fullerene. Furthermore, the proton conductor 3 is obtained by forming the fullerene derivative into a film shape by the coating or the deposition. Here, the proton conductor 3 contacts to both sides of a porous separator 5.

In addition, the proton conductor 3 may be formed into a film shape by pressing only the fullerene derivative. Alternatively, it may be formed into a film by adding a binder to the fullerene derivative and performing the pressing, the extrusion molding, or the like.

Polymeric materials which can be used as the binder are not limited to those which produce as less inhibition of the conductivity of the protons (due to the reaction with the fullerene derivative) as possible, and which have workability for forming films. Usually, those which have no electron conductivity and good stability are used, and for example, one or two kinds or more of well-known polymers which have the workability for forming films are used. The concrete examples include polytetrafluoroethylene, polyvinylidene fluoride, polyvinyl alcohol, and these are more preferable polymeric materials for the reason explained below.

First, polytetrafluoroethylene is preferable, because less mixing amount thereof enables larger thin films with higher strength to be easily formed compared with other polymeric materials. In this case, the mixing amount can become low, for example, it is 3 weight % or less, preferably 0.5–1.5 weight %, and thickness of the thin films can usually be reduced and become in a range from 100 μm to 1 μm.

Moreover, polyvinylidene fluoride and polyvinyl alcohol are preferable, because thin films which have the proton conductivity and the excellent ability of preventing gas permeability can be obtained. The mixing amount in this case is preferably in a range of 5–15 weight %.

Thus, the proton conductor 3 into which the binder is added, can not only exhibit the similar proton conductivity to the case of using only the fullerene derivative, but also has a thinner (about 300 μm or less) and more flexible structure with higher strength and the ability of preventing the gas permeability, compared with the compression-molded objects of the fullerene derivative powder.

Next, the case of the proton conductor 3 with a structure containing a derivative of a carbon cluster will be described.

Generally, carbon clusters are aggregates formed by bonding or aggregating several to hundreds of atoms, and the aggregating (assembling) thereof can improve the performance of the proton conductivity. Bonds between the atoms can provide films of the carbon clusters with high strength and enable layers to be formed easily. Moreover, the clusters contain carbon as a principal component, and are the aggregates formed by bonding several to hundreds of carbon atoms by any kind of carbon-carbon bonds. It should be noticed that the composition thereof is not necessarily limited only to 100% carbon cluster, and may also be mixtures containing other atoms. Here, aggregates which have a large number of carbon atoms also including such a case are called the carbon clusters.

The carbon clusters are used as the essential part, because a lot of proton dissociating groups are needed to be introduced for providing the excellent proton conductivity, and can be accomplished by the carbon clusters. In such a case, the acidity of the solid-like proton conductor becomes remarkably high, but the carbon clusters are less subject to oxidative deterioration unlike other carbon structures, and has excellent durability, and the constituent atoms bond each other closely, so the bonds between the atoms is not be broken even if the acidity is high (namely, it is hard to change chemically), and thus the film structure can be maintained.

Figure 9A:
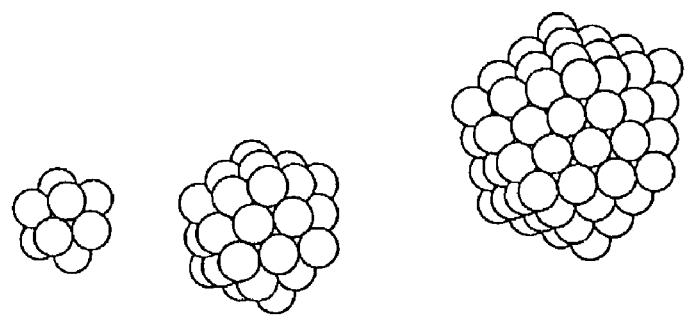
FIGS. 9A to 9C are model diagrams showing examples of a carbon cluster contained in a proton conductor according to an embodiment of the invention.
Figure 9B:
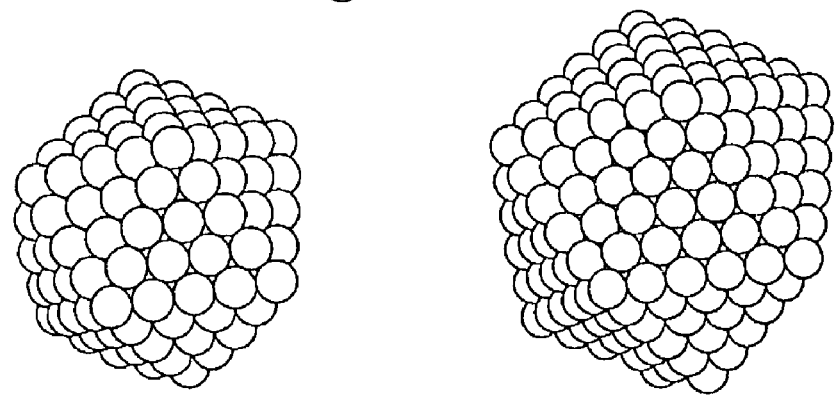
Figure 9B:
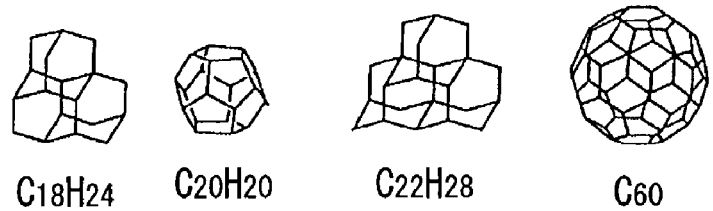
Figure 9C:
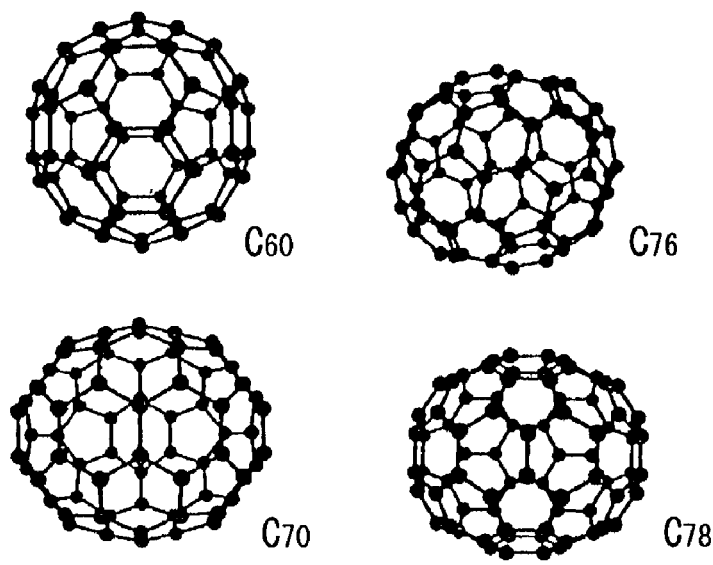
Figure 10A:
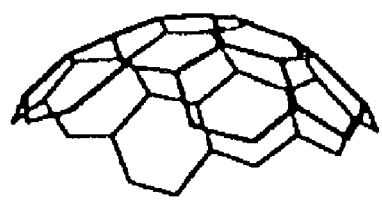
FIGS. 10A to 10D are model diagrams showing examples of a partial fullerene structure as a carbon cluster contained in a proton conductor according to an embodiment of the invention.
Figure 10B:
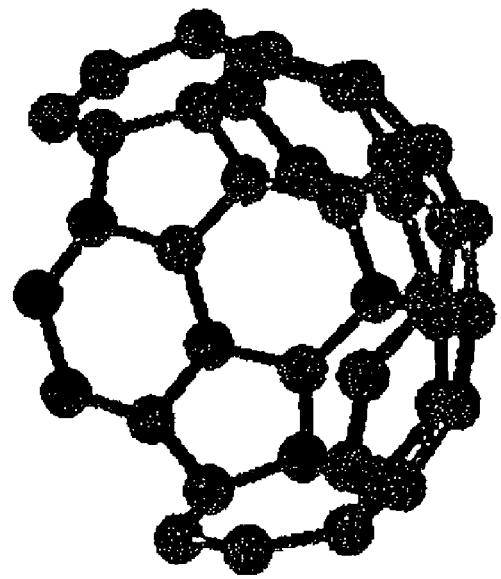
Figure 10C:
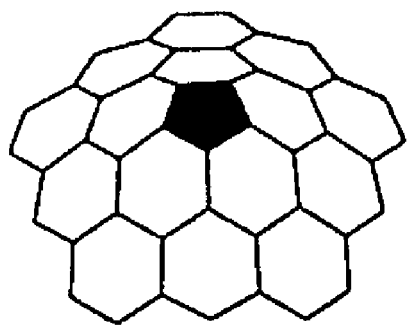
Figure 10D:
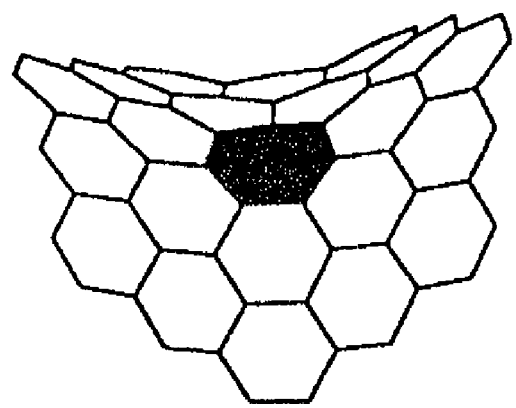
Figure 11A:
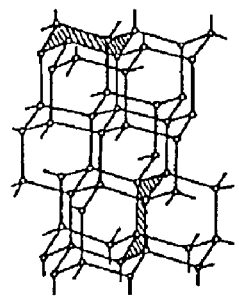
FIGS. 11A to 11G are model diagrams showing examples of a diamond structure as a carbon cluster contained in a proton conductor according to an embodiment of the invention.
Figure 11B:
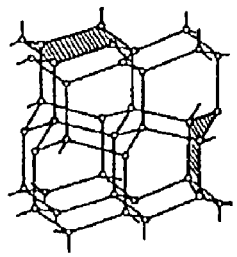
Figure 11C:
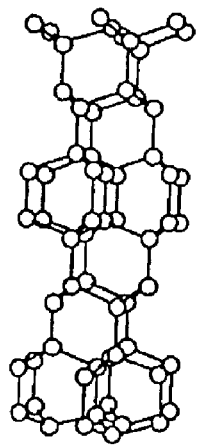
Figure 11D:
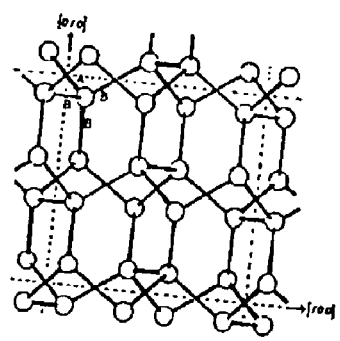
Figure 11E:
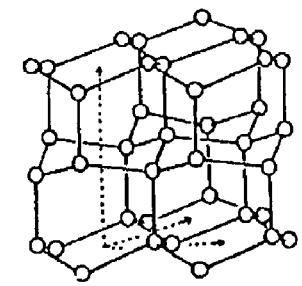
Figure 11F:
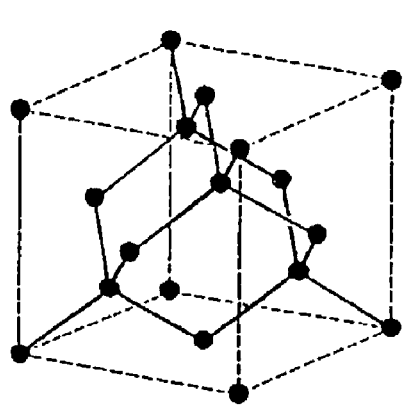
Figure 11G:
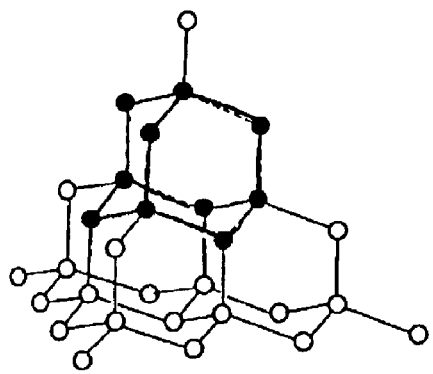

FIGS. 9A to 12G show examples of the carbon clusters used as a raw material of the proton conductor 3 respectively. FIGS. 9A to 9C represent carbon cluster groups which have sphere, prolate spheroid, or closed surface structure similar to these where many carbon atoms gather (in addition, molecule-like fullerenes are also shown). On the other hand, FIGS. 10A to 10D represent carbon cluster groups which have a structure in which a part of spherical shell of the clusters shown in FIGS. 9A to 10C 9C are missing (the black portions in FIGS. 10C and 10D represent 5-membered ring or 7-membered ring). In these cases, the structure has an open edge, which is characteristic, and such structure can be found in many cases as a subproduct in manufacturing processes of the fullerenes using arc discharge.

Moreover, FIGS. 11A to 11G show carbon clusters having a diamond structure where most carbon atoms form $SP^3$ bonds.

It should be noticed that the clusters where most of the carbon atoms form $SP^2$ bonds, have a planar structure of graphite, or the whole or a part of the structure of the fullerene or a nanotube. Among them, many clusters having the graphite structure have electron conductivity, and thus are not preferable as the essential part of the proton conductor.

On the contrary, the $SP^2$ bonds of the fullerene and the nanotube partially contains elements of $SP^3$ bond, and thus many of them have no electron conductivity, and they are preferable as the essential part of the proton conductor 3.

Figure 12A:
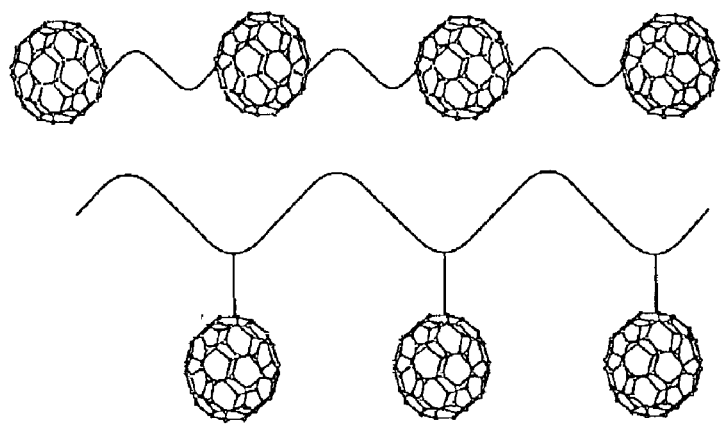
FIGS. 12A to 12G are model diagrams showing examples of a combination of clusters as a carbon cluster contained in a proton conductor according to an embodiment of the invention.
Figure 12B:
Figure 12C:
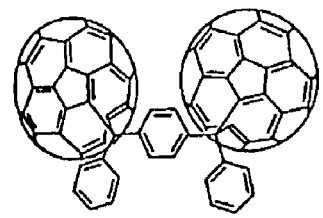
Figure 12D:
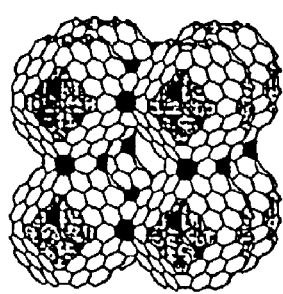
Figure 12E:
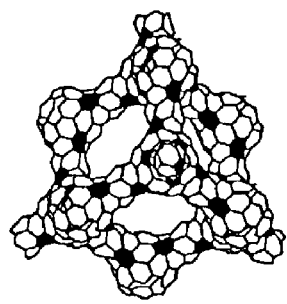
Figure 12F:
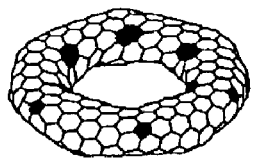
Figure 12G:
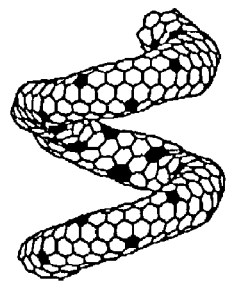

FIGS. 12A to 12G show the cases of clusters bonding each other (the thin lines drawn between the clusters in FIG. 12A represent binding chains such as —$(CH_2)_n$— and —$(CF_2)_n$—, and the black portions in FIGS. 12D to 12G represent 5-membered ring or 7-membered rings). Such a structure is also applicable.

Here, the carbon clusters as the essential part have a long axis of 100 nm or less, especially and preferably of 10 nm or less, and it is desirable to have two or more functional groups being introduced into the clusters.

Furthermore, the carbon clusters are preferably basket-like structures or structures having at least partially an open edge. The fullerenes with the missing structure as the example have the reactivity of the fullerenes, and additionally and simultaneously, lacked sections thereof, i.e., open sections, have much higher reactivity. Therefore, by the acid treatment or the like, the introduction of the acid (proton) dissociating groups is promoted, a higher rate of functional group introduction is obtained, and high proton conductivity is acquired. Moreover, larger-scale synthesis thereof becomes possible compared with the fullerenes, and the very inexpensive production is possible.

As a means for introducing the proton dissociating groups described previously into the above carbon clusters, the following manufacturing method is preferable.

That is, first, the carbon clusters made of carbon powder are produced using the arc discharge of a carbon electrode. Then, the carbon clusters are suitably treated by required steps selected from an acid treatment using sulfuric acid or the like, the hydrolysis or the like, and the sulfonation or phosphate esterification. Thereby, desired carbon cluster derivatives can be obtained easily. The carbon cluster derivatives can directly be formed into a shape such as films, pellets, or the like without a binder by the pressing.

The proton conductor 3 containing such carbon cluster derivative as the principal component has the carbon cluster as the essential part, so the protons tend to be dissociated even in a dry environment, and the excellent effects including the proton conductivity are exhibited like the case where the fullerenes are used as the essential part. Moreover, as illustrated, there is an advantage of the broad range of choice for the material of the essential part.

Next, the case of the proton conductor 3 with a structure containing a derivative of the linear carbon structures will be described.

The linear carbon structures are preferably tube shapes or fiber shapes, and for example, a carbon nanotube or a carbon fiber is preferable.

The carbon nanotube or the carbon fiber tends to emit electrons because of its structure, and can have very large surface area, which can accomplish more improvements in proton propagation efficiency.

These can be manufactured by the arc discharge method or the chemical vapor deposition (the thermal CVD).

For example, with the arc discharge method, the carbon nanotubes can be obtained using synthesis in the helium atmosphere (for example, at 20 kPa) with an arc discharge chamber and metal catalysts such as FeS, Ni, or Co, and deposition on an inner wall of the chamber into a cloth-like shape with the arc discharge. Here, the above carbon nanotube with a small bore can be obtained, when the above catalyst exists together, and the above carbon nanotube constituted of a multilayer with a large bore can be obtained, when the arc discharge is performed on the condition of non-catalyst.

Figure 13A:
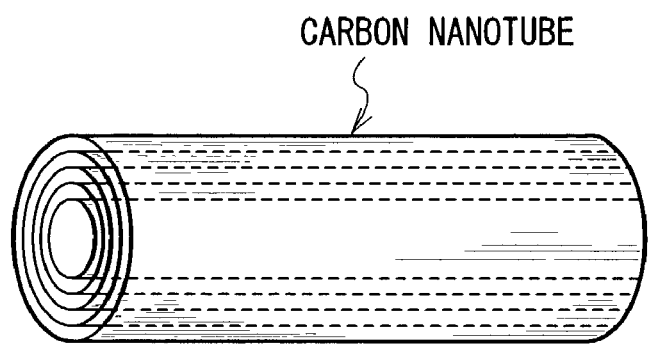
FIGS. 13A to 13C are schematic views of carbon nanotubes and a carbon fiber used as an essential part of a proton conductor according to an embodiment of the invention.
Figure 13B:
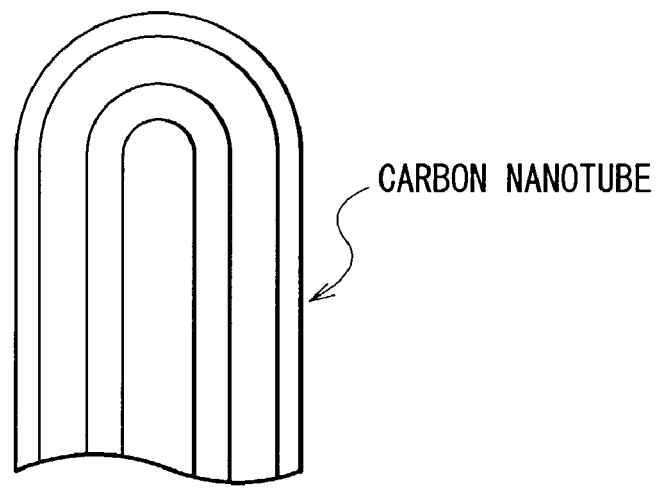

A cylinder-like structure of a graphene sheet of the multilayer carbon nanotube as shown in FIGS. 13A and 13B, which can be produced using the arc discharge on the condition of non-catalyst as mentioned above, is a high quality carbon nanotube with no defect, and it is known that this has very high efficiency as electron emission material.

The proton dissociating groups can be introduced into the carbon nanotube obtained by the arc discharge method in a processing way similar to that of the above carbon clusters, and the proton conductor 3 which has excellent proton conductivity also in the dry environment is obtained.

The chemical vapor deposition is the technique used for synthesizing the carbon nanotube or the carbon fiber by reacting transition metal particles with a hydrocarbon such as acetylene, benzene, and ethylene, or CO. Specifically, a transition metal substrate or a coat substrate is reacted with the hydrocarbon or CO gas to deposit the carbon nanotube or the carbon fiber on the substrate.

Figure 13C:
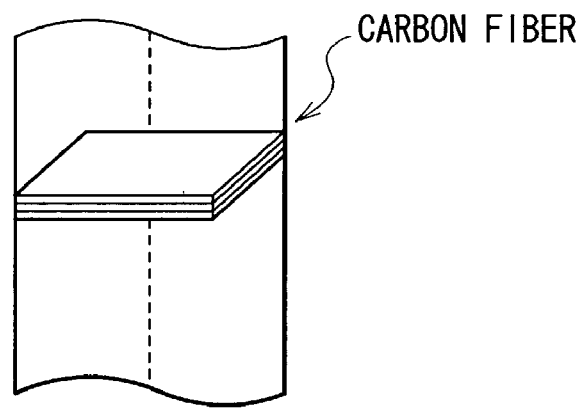

For example, the carbon fiber having a structure as shown in the perspective view of FIG. 13C can be synthesized by locating a Ni substrate in a alumina tube heated at 700° C., and reacting it with toluene/$H_2$ gas (for example, 100 sccm).

In addition, an aspect ratio of the carbon nanotube is preferably 1:1000–1:10, and an aspect ratio of the carbon fiber is preferably 1:5000–1:10. Moreover, the bore of these linear carbon structures is preferably 0.001–0.5 μm, and a length thereof is preferably 1–5 μm.

According to the embodiment, the proton conductor 3 has a structure containing at least one kind of the carbon materials mentioned above. Moreover, it preferably contacts at least to one side of the porous separator 5 such as polyethylene (PE), and more preferably contacts to both sides thereof like the embodiment. Thereby, other substances except for the protons which exists on the anode 1 side, water, oxygen generated at the anodes 1 and the like, are prevented from transferring to the cathode 2 side, and simultaneously the form of the proton conductor 3 is maintained. In addition, holes of the porous separator 5 can be filled with the proton conductor 3, which enables the protons generated at the anode 1 to be conducted to the cathode 2 efficiently.

The proton conductor 3 is inserted between the anode 1 and the cathode 2 through the catalyst layers 4, and a main part section which is constituted so that each of the above layers might contact each other, is housed inside an outer frame 7A made of SUS or the like. A hole for supplying water vapor or the water vapor-containing air is located in the outer frame 7A on the anode 1 side.

Moreover, a $H_2$ storage tank 6 for holding or storing the generated hydrogen is located on the cathode 2 side of the main part section. The $H_2$ storage tank 6 has a $N_2$ feed opening 8 for supplying nitrogen ($N_2$) which is an inert gas, and a $N_2$ outlet 9 for extracting hydrogen stored inside with discharging nitrogen ($N_2$). In addition, the $H_2$ storage tank 6 can be composed of glass, metals, plastics, or the like, or can be also a cartridge-type one which is exchangeable when being filling with hydrogen. Alternatively, a hydrogen occluding alloy may be attached to the inside so that hydrogen may be absorbed and stored in it.

In addition, while electric supply means for the electrodes 1 and 2 are not especially limited, it is preferable to use metals with heat resistance and corrosion resistance, for example, those constituted of a conductive oxide with stable conductivity such as ruthenium oxide coated on a titanium mesh surface can be used suitably.

The following electrode reaction occurs at the anode 1 and the cathode 2 of the apparatus for producing hydrogen 10 as constituted in the above way.

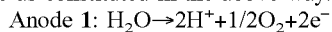
Anode 1: $H_2O \rightarrow 2H^+ + 1/2 O_2 + 2e^-$
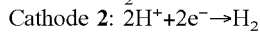
Cathode 2: $2H^+ + 2e^- \rightarrow H_2$ That is, when energized between the anode 1 and the cathode 2, and supplying water to one side of the anode 1 in a gaseous state or a vapor state through the hole of the outer frame 7A, water is electrolyzed at the anode 1, and protons ($H^+$) is generated. These protons ($H^+$) are conducted from the anode 1 to the cathode 2 through the proton conductor 3, and the protons ($H^+$) are converted to hydrogen at the cathode 2. In this connection, theoretical electrolytic voltage in that case is 1.22 V. In fact, electrode overvoltage, electric resistance, and the like are added to this value and the electrolytic voltage becomes about from 1.5 V to 2 V.

In addition, the temperature at the time of the water electrolysis is any temperature at which water exists as gas: preferably −50 to 300° C., and more preferably −40 to 160° C. The reason is that the temperature lower than the above range decreases the conductivity of the proton conductor 3, causing reduction of the efficiency, and the higher temperature easily causes decomposition of the proton conductor 3 itself.

Moreover, the partial pressure of water (vapor) supplied to the anode 1 is preferably 267 Pa–267 kPa. The reasons are that the partial pressure lower than the above range can prevent sufficient decomposed hydrogen from be obtained, and the higher pressure can easily occur degradation of the cell properties due to dew condensation of water.

Here, hydrogen produced in such way is stored in the $H_2$ storage tank 6 which is directly attached on one side of the cathode 2. For example, if a fuel cell is combined to the $H_2$ storage tank 6 through a bulb such as the $N_2$ outlet 9, hydrogen can be supplied to the fuel cell. When storing hydrogen using the hydrogen occluding alloy, absorbed hydrogen can be emitted by heating the hydrogen occluding alloy. In any methods, it is possible to use the stored hydrogen as a raw material of fuel cells.

Moreover, if the apparatus for producing hydrogen 10 is used combining a solar battery or wind power, energy storage is enabled by transforming natural energy into electrical energy, and then transforming the transformed electrical energy into hydrogen by the apparatus for producing hydrogen 10.

Thus, in the embodiment, the proton conductor 3 which itself has the proton conductivity is used as a solid electrolyte layer between the anode 1 and the cathode 2, so hydrogen can be produced in the air of the low humidity state. Therefore, the operation is merely performed in the air without humidifying to high humidity unlike the conventional example using the Nafion, so an initial operation of the hydrogen manufacturing can start early, and no humidifier can be needed. Furthermore, it is not necessary to adjust temperature, humidity, pressure, and the like, so hydrogen can be produced simply and efficiently. It should be noticed that a humidifier may be mounted to humidify the proton conductor 3 in the apparatus for producing hydrogen.

Figure 8:
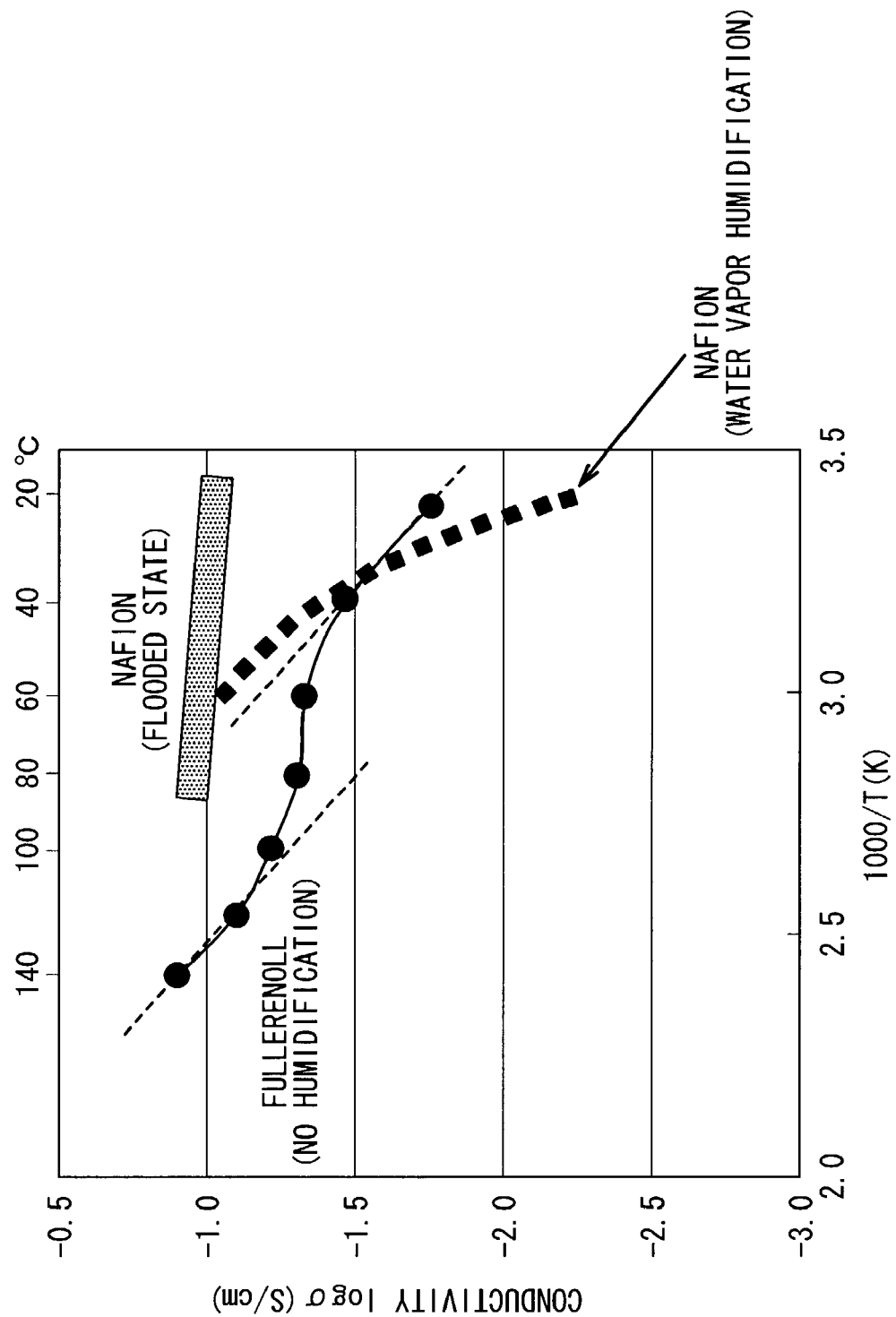
FIG. 8 is a view showing a relation between ion conductivity of the proton conductor with operating temperature in the apparatus for producing hydrogen shown in FIG. 1.

FIG. 8 is a view showing a relation between temperature and conductivity in the utilization of the fullerene derivatives such as the fullerenols as the proton conductor 3, comparing with the utilization of Nafion instead of the proton conductor 3. The results show that the utilization of Nafion prevented the exhibition of the ion conduction unless being in the humidified or flooded state, and an operational temperature range thereof is also narrow, but the utilization of the fullerene derivatives can provide the ion conductivity of 10–100 mS/cm higher than that of Nafion even in no humidification.

Moreover, the conventional hydrogen manufacturing has needed the dehumidifiers due to simultaneously generating water, because Nafion conducts the $H_3O^+$ ions. On the other hand, according to the embodiment, only hydrogen can be produced and no dehumidifier can be needed, because the proton conductor 3 allows the protons ($H^+$) to be conducted and these are converted into hydrogen.

As mentioned above, the apparatus for producing hydrogen 10 can be a more compact and highly versatile apparatus, and hydrogen can be produced efficiently and simply by using the apparatus.

Furthermore, according to the embodiment, the apparatus for producing hydrogen 10 can not only produce hydrogen, but also supply hydrogen to the fuel cells and the like, and conversely, transform electrical energy into hydrogen to store the energy.

Figure 3:
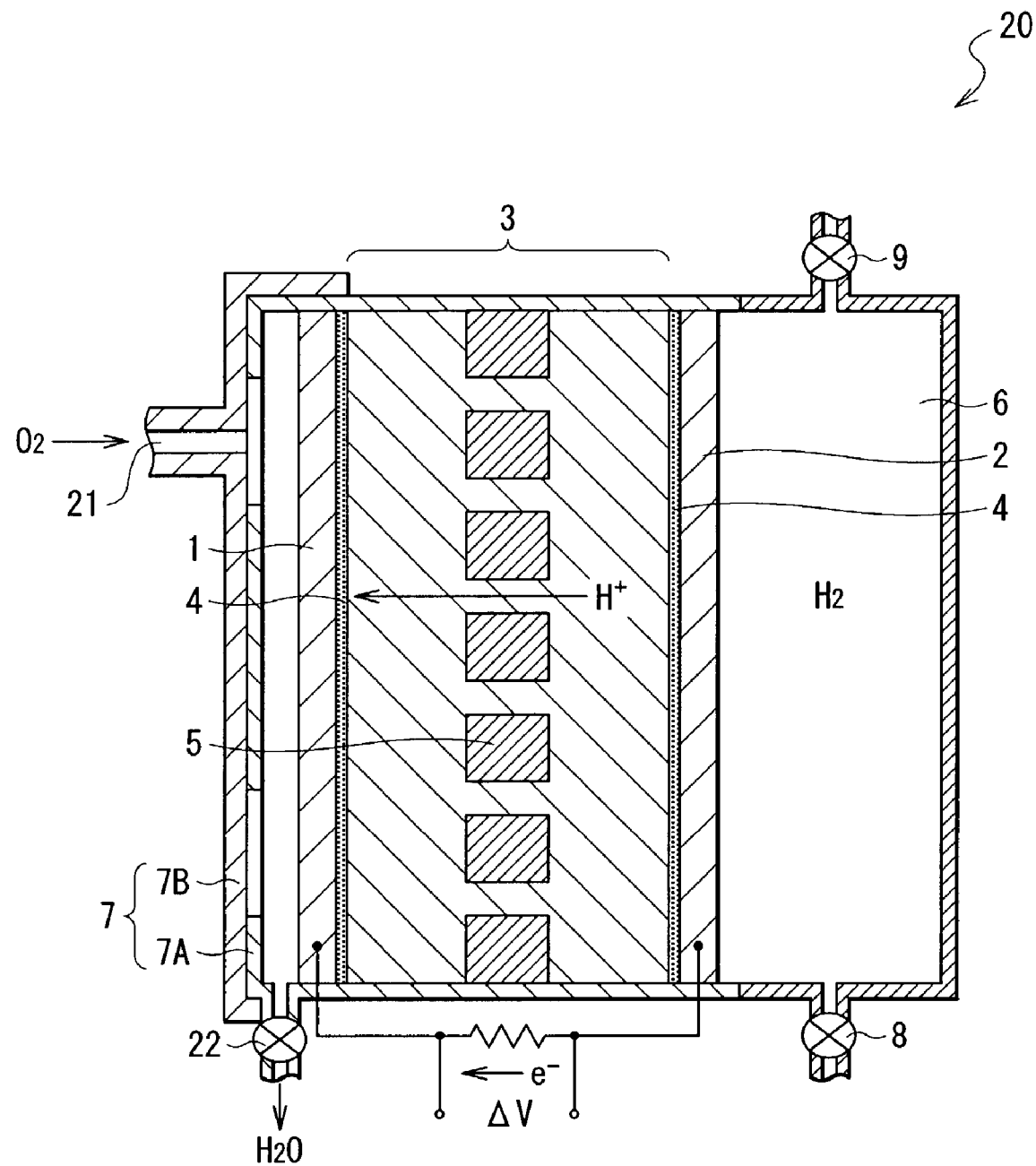
FIG. 3 is a sectional view of an electrochemistry device according to an embodiment of the invention.

FIG. 3 is a sectional view showing the construction of an electrochemistry device according to the embodiment. The electrochemistry device 20 has main portions constructed in the same way as the apparatus for producing hydrogen 10, and has a structure which enables two kinds of operations of the step of generating hydrogen by electrolyzing water with the above electrode reaction like the apparatus for producing hydrogen 10, and the step of generating water from hydrogen with the reverse reaction thereof. Therefore, the same elements as the apparatus for producing hydrogen 10 will be denoted by the same symbols, and the description thereof will be eliminated accordingly.

In the electrochemistry device 20, for example, an outer frame 7 with a structure where an outer frame 7B is applied on the outer frame 7A, is mounted and an oxygen feed opening 21 and a $H_2O$ outlet 22 lead to the outer frame 7. Oxygen is supplied from the oxygen feed opening 21 to a surface of the anode 1 on the outer frame 7 side. Moreover, water generated at the anode 1 is discharged through the $H_2O$ outlet 22.

In the electrochemistry device 20, not only hydrogen is generated from water and stored in the $H_2$ storage tank 6 like the apparatus for producing hydrogen 10, but the generated and stored hydrogen is decomposed into protons ($H^+$) at the cathode 2, and the protons ($H^+$) are conducted to the anode 1 through the proton conductor 3, and the protons ($H^+$) are converted into water at the anode 1. The reactions of both electrodes in that case are:

Anode 1: 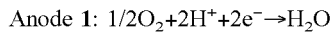 $1/2O_2 + 2H^+ + 2e^- \rightarrow H_2O$

Cathode 2:  $H_2 \rightarrow 2H^+ + 2e^-$

In the reaction process, electrochemistry energy is obtained between the cathode 2 and the anode 1. That is, the electrochemistry device 20 can be used as a fuel cell.

In addition, it is also possible to store oxygen generated at the anode 1 in the hydrogen producing process, and oxygen can also be recycled by supplying the stored oxygen to the anode 1 in the electrochemistry energy generating process.

Figure 6:
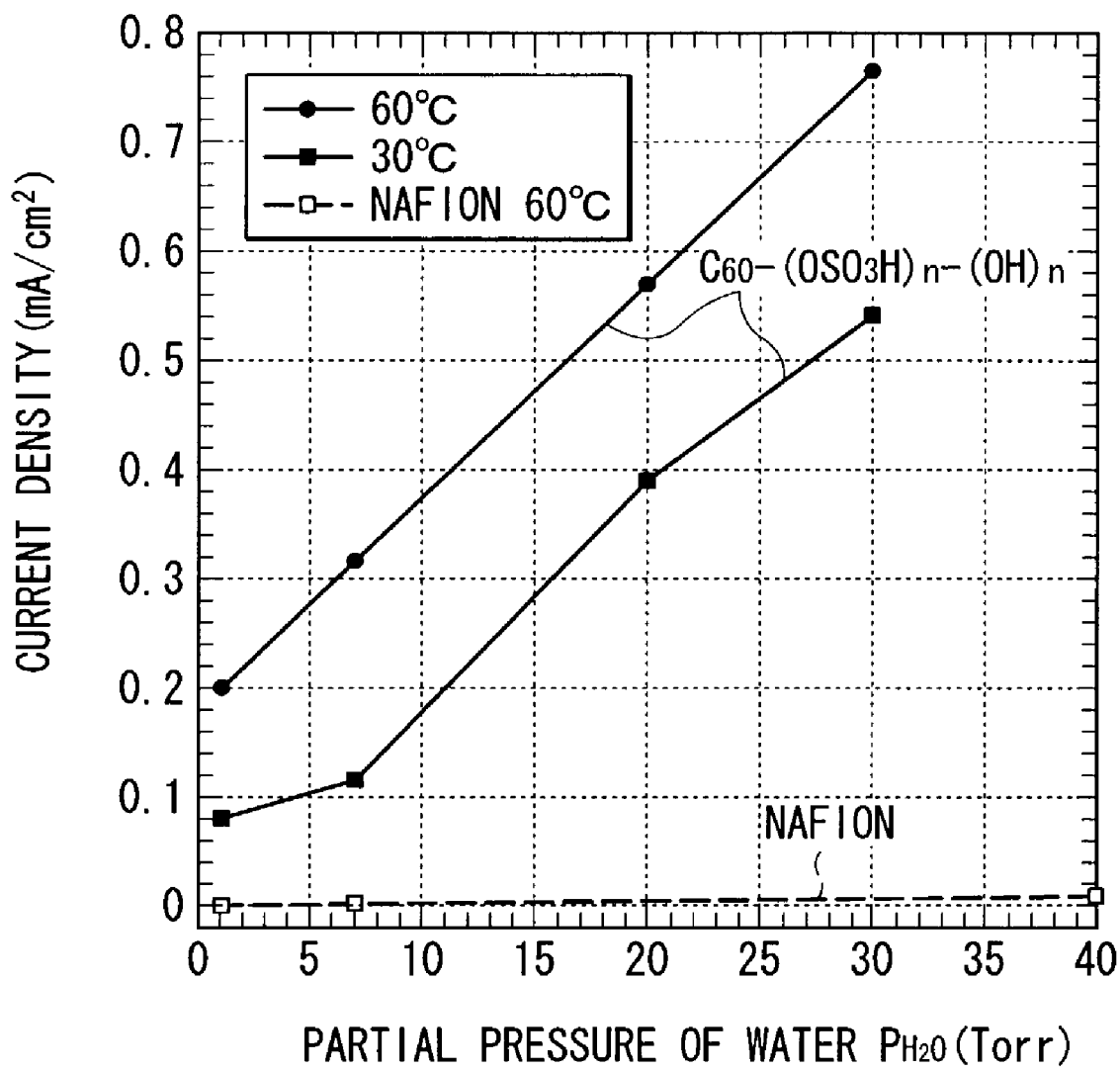
FIG. 6 is a view showing a relation between partial pressure of supply water and current density output in the electrochemistry device shown in FIG. 3.

FIG. 6 is a view showing a relation between partial pressure of the supplied water and current density obtained as output of the device 20 in the utilization of sulfuric ester fullerenol as the proton conductor 3 of the electrochemistry device 20 comparing with the utilization of Nafion instead of the proton conductor 3. In the low humidity atmosphere with partial pressure of water below 5 kPa (40 Torr), electric current output can be favorably obtained when the electrochemistry device 20 using the fullerene derivative is used, but the current density is almost 0 mA/cm² when Nafion is used. In addition, it is revealed that the amount of electric current is proportional to the partial pressure of water, and also the higher the operating temperature, the higher the electric current obtained, in the electrochemistry device 20.

Figure 7:
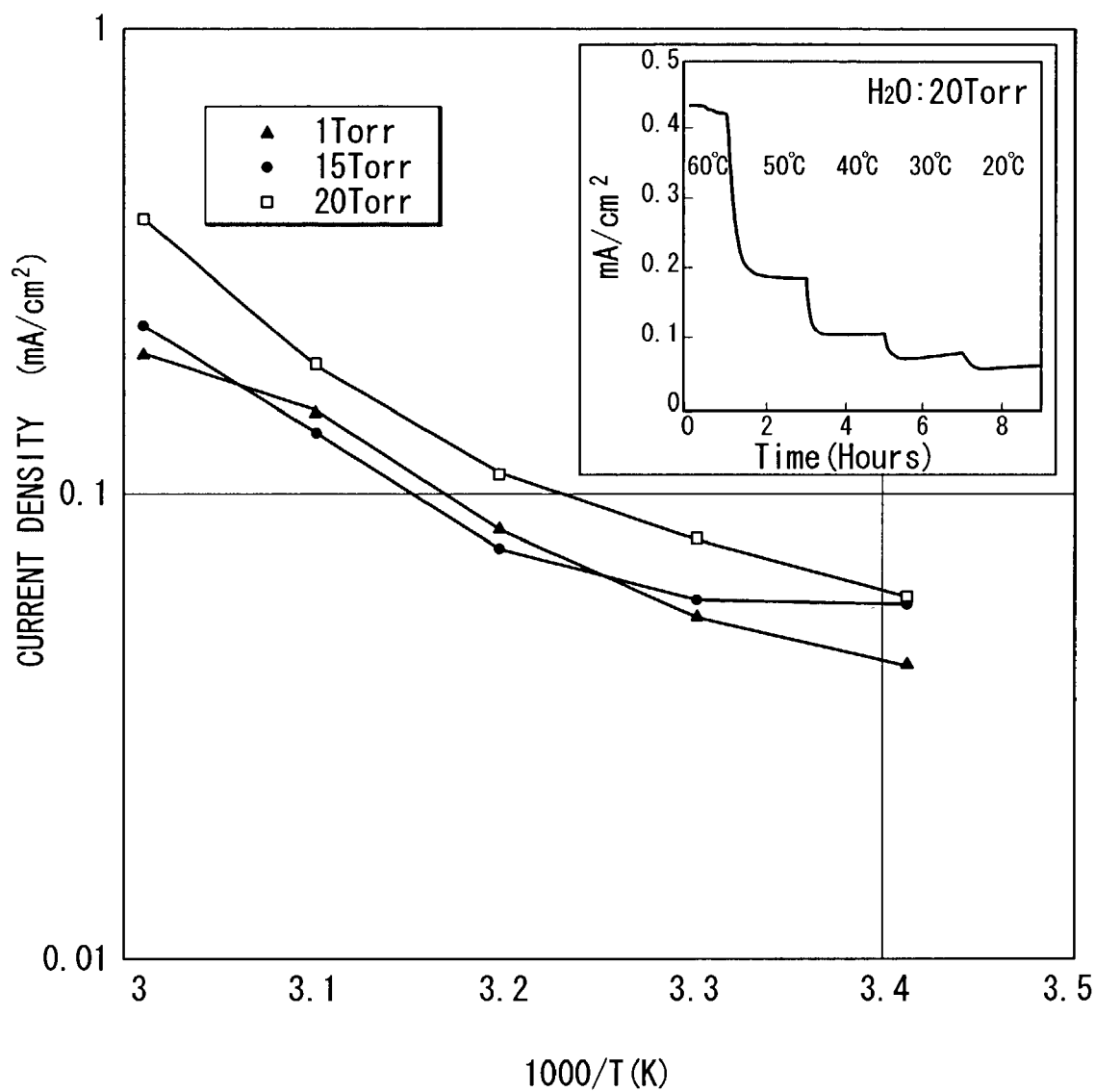
FIG. 7 is a view showing a relation between operating temperature and current density output in the electrochemistry device shown in FIG. 3.

Furthermore, FIG. 7 shows a relation between temperature and current density in the utilization of the fullerene derivative as the proton conductor 3. The Figure indicates that the higher the setting temperature of the apparatus and the higher the partial pressure of water, the higher the current density obtained.

As described above, the electrochemistry device 20 has the same composition as the apparatus for producing hydrogen 10, and thus the same effect as the apparatus for producing hydrogen 10 can be demonstrated, and the efficient operations can be possible.

Hereinafter, the invention will be described concretely based on Examples.

EXAMPLE 1

An apparatus for producing hydrogen as shown in FIG. 1 was fabricated. First, the proton conductor 3 was produced by applying a mixture prepared by mixing fullerenol ($C_{60}(OH)_n$) powder and THF (tetrahydrofuran) liquid with 1:2 weight ratio to both sides of a porous polyethylene film (30% of a porosity rate) 5 having a film thickness of 9 μm by the doctor blade method, and drying in the room temperature and the room air for 15 minutes.

Then, the anode 1 and the cathode 2 were produced by supporting Pt on each surface not to contact to the proton conductor 3 of carbon sheets as the anode 1 and the cathode 2 in order to enlarge an area in contact with the proton conductor 3, applying the above obtained mixture of the fullerenol and THF also to the Pt support surfaces of the carbon sheets, and drying on the same conditions as those of producing the proton conductor 3.

The cathode 2 and the anode 1 to which the fullerenol was applied, were pasted to both sides of the above obtained proton conductor 3 so that the catalyst support surfaces might contact to the proton conductor 3, and the shape thereof was formed by the pressing. The pressure was 500 kg/cm². Thereby, an MEA film of 500 μm in apparent thickness was formed.

Next, in order to measure amounts of generated hydrogen, a measuring tub was prepared by fixing a SUS board spacing 2 mm away from a surface of the cathode 2 and sealing the periphery to provide a space adjacent to the cathode 2, and fixing the MEA film so that the cathode 2 for generating hydrogen might direct inside and the anode 1 in contact with the air might direct outside. A nitrogen feed opening 8 and an outlet 9 were located in the measuring tub, and 20 sccm of dry nitrogen gas was circulated. A hydrogen concentration analyzer for measuring hydrogen in the nitrogen is attached to the outlet 9. The measuring tub was put into a constant temperature and humidity chamber, water was electrolyzed in the vapor state or the gas state sending the air to the anode 1 side. The hydrogen concentration before applying voltage was zero, i.e., below the measurement limit.

Figure 14:
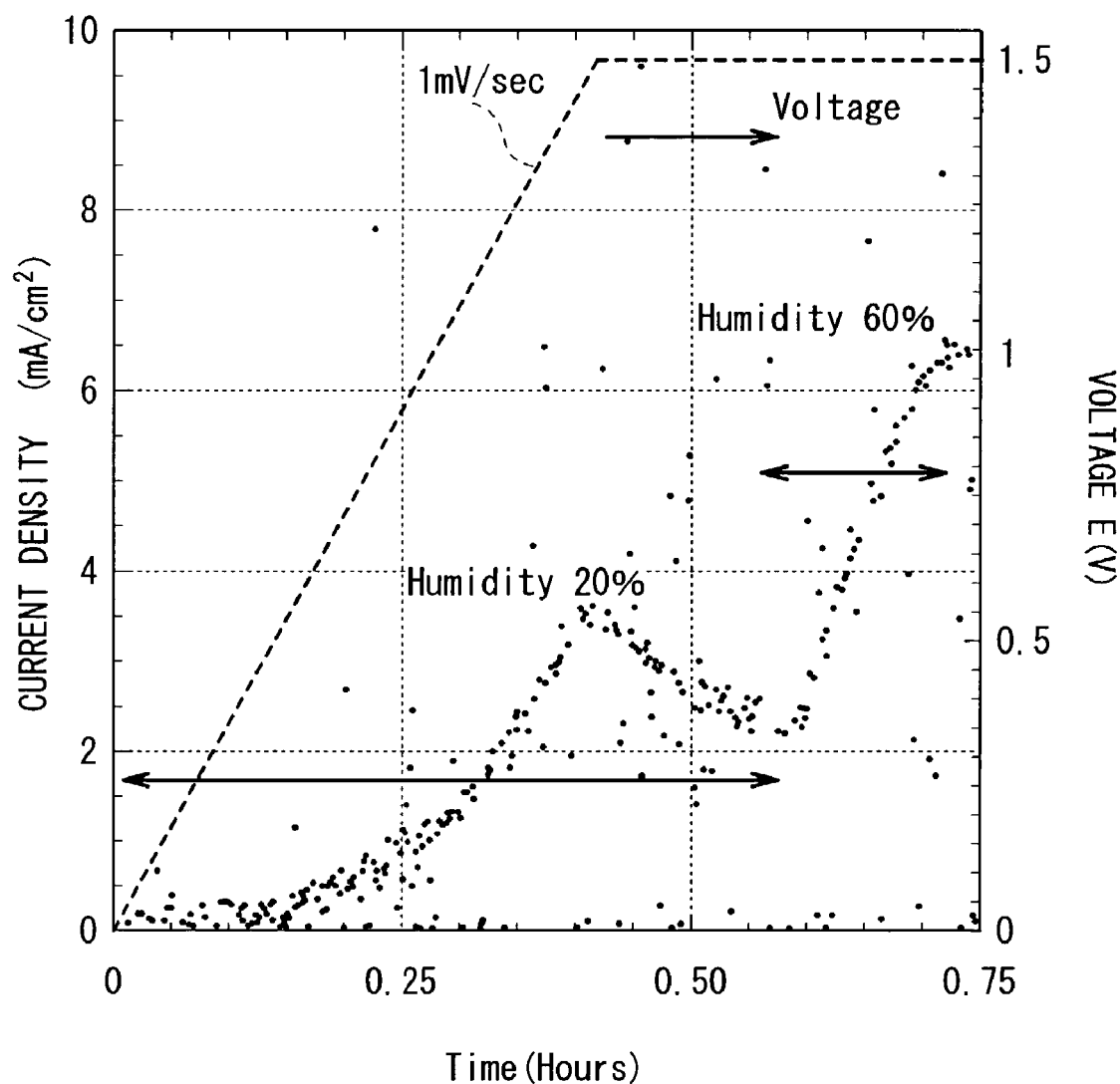
FIG. 14 is a view showing an electric current property against humidity of fullerenol according to an example of the invention.

Here, the temperature of the constant temperature and humidity chamber was set to 25° C., the humidity was set to 20% by using a drying agent or the like, the electrolytic voltage was increased from 0 V to 1.5 V at the rate of 1 mV/sec, the state of applying 1.5 V was hold for 10 minutes, and then, the humidity was increased from 20% to 60%. Consequently, significant increase in current density as shown in FIG. 14 was found. The reason is that $H_2O$ in the air was decomposed into oxygen and protons on the surface of the anode catalyst layer of the MEA film and the protons were transferred to the cathode side.

EXAMPLE 2

The constant temperature and humidity chamber of the apparatus for producing hydrogen made of the MEA film produced in Example 1 was set to 25° C. and 60% of humidity, the electrolytic voltage was increased from 0 V to 1.5 V at the rate of 1 mV/sec, and the state of applying 1.5 V was hold, and 10 minutes later, the formation of about 1000 ppm of $H_2$ was found in the nitrogen gas in the measuring tub. Moreover, very slight entry of $O_2$ was found in the generated hydrogen. It is thought that the separation from the atmosphere by the sealing seal or the fullerenol as the proton conduction film was inadequate. In addition, each of $O_2$ and $H_2O$ was 1 ppm or less in the hydrogen generated at the cathode 2 side, and the obtained purity was as the same level as that of hydrogen acquired in the usual water electrolysis.

EXAMPLE 3

The constant temperature and humidity chamber of the apparatus for producing hydrogen made of the MEA film produced in Example 1 was set to 25° C. and 90% of humidity, the electrolytic voltage was increased from 0 V to 1.5 V at the rate of 1 mV/sec, and the state of applying 1.5 V was hold, and 10 minutes later, the formation of about 10000 ppm of $H_2$ was found in the nitrogen gas in the measuring tub. Moreover, very slight entry of $O_2$ was found in the generated hydrogen. It is thought that the separation from the atmosphere by the sealing seal or the fullerenol as the proton conduction film was inadequate. In addition, each of $O_2$ and $H_2O$ was 1 ppm or less in the hydrogen generated at the cathode 2 side, and the obtained purity was as the same level as that of hydrogen acquired in the usual water electrolysis.

COMPARATIVE EXAMPLE 1

The similar experiments were performed on the conditions of the constant temperature and humidity chamber of Example 2, using Nafion 415 manufactured by DuPont, instead of the proton conductor 3 where the porous film (separator) 6 supported the fullerenol. When the electrolytic voltage was increased from 0 V to 1.5V at the rate of 1 mV/sec and the state of applying 1.5 V was hold, the current density was 0.01 $mA/cm^2$ or less, and the hydrogen concentration in the nitrogen gas in the measuring tub was 1 ppm (the measurement limit) or less.

COMPARATIVE EXAMPLE 2

The similar experiments were performed on the same conditions of the constant temperature and humidity chamber of Example 3, using Nafion 415 manufactured by DuPont, instead of the proton conductor 3 where the porous film (separator) 6 supported the fullerenol. When the electrolytic voltage was increased from 0 V to 1.5V at the rate of 1 mV/sec and the state of applying 1.5 V was hold, 10 minutes later, about 100 ppm of $H_2$ was formed in the nitrogen gas in the measuring tub, and 20 minutes later, about 1000 ppm of $H_2$ was formed in the nitrogen gas in the measuring tub. Moreover, at the same time of generating $H_2$, the formation of about 2000 ppm of $H_2O$ was found in the nitrogen gas.

COMPARATIVE EXAMPLE 3

The hydrogen produce experiment was performed for 2 hours on the condition of Comparative Example 2 using the Nafion film, and finally the generated hydrogen concentration was decreased to about 50 ppm. The reason given is that $H_2O$ generated at the cathode 2 side was deposited on the electrode surface.

Obviously from Examples 1, 2, and 3 and Comparative Examples 1, 2, and 3, the utilization of the Nafion film as the proton conductor did not allow hydrogen to be generated, for example, in the atmosphere of 60% of humidity, and allowed hydrogen to be generated but simultaneously water to be generated in the atmosphere of 90% of humidity, so continuously producing of hydrogen was not expected. On the other hand, in the method for producing hydrogen and apparatus according to the invention, the fullerene derivative such as the fullerenol, was used as the proton conductor, so it was able to function even in the air with the low humidity state, and even without humidifier or dehumidifier, it was possible to produce hydrogen efficiently.

EXAMPLE 4

Figure 15:
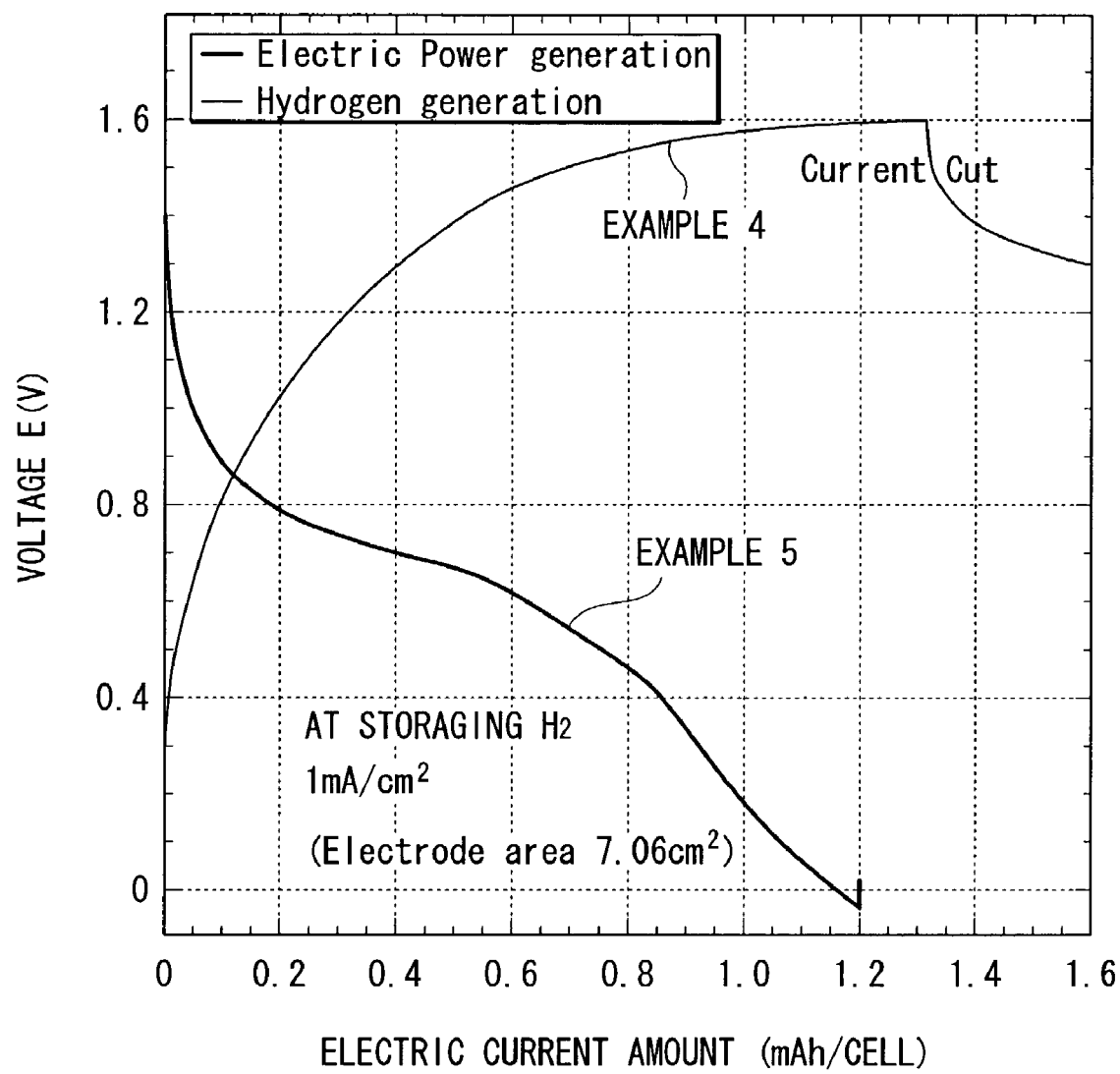
FIG. 15 is a view showing hydrogen generating and electric power generating with a cell using fullerenol as a proton conductor.
Figure 16:
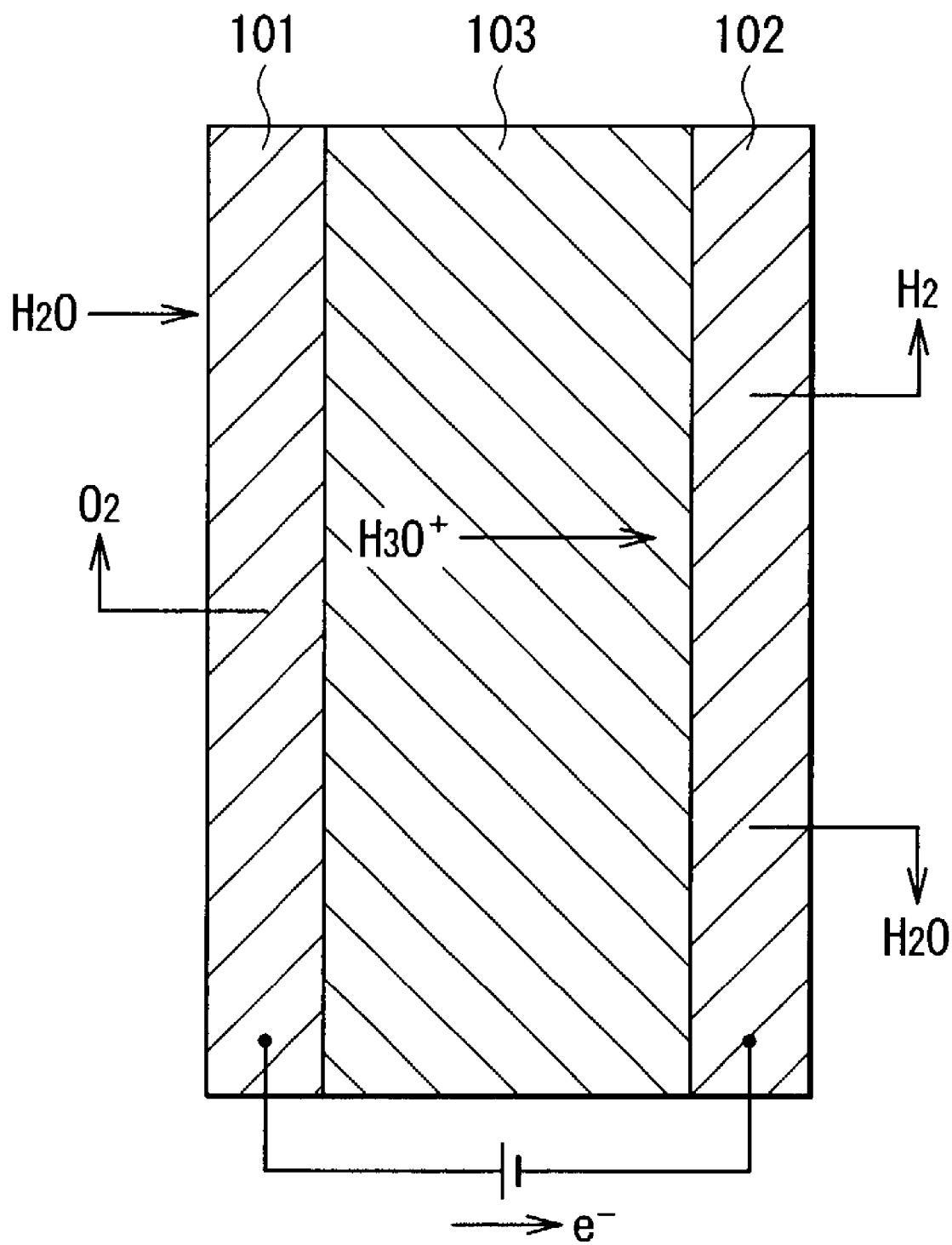
FIG. 16 is a sectional view showing an outline structure of a conventional apparatus for producing hydrogen.

The nitrogen feed opening 8 and the outlet 9 of the measuring tub were sealed, the constant temperature and humidity chamber was set to 25° C. and 60% of humidity, 0–1.6 V of the voltage was applied to the cell using the fullerenol as the proton conductor in a constant current mode of 1 $mA/cm^2$, the electrolysis was performed, and the generated hydrogen was stored. Consequently, hydrogen corresponding to 1.3 $mAh/cm^2$ of the electric current amount as shown in FIG. 15 was allowed to be generated and stored inside of the measuring tub.

EXAMPLE 5

The measuring tub was sealed like Example 4, the constant temperature and humidity chamber was set to 25° C. and 65% of humidity, 0–1.6 V of the voltage was applied to the cell using the fullerenol as the proton conductor in the constant current mode of 1 $mA/cm^2$, the electrolysis was performed, and hydrogen corresponding to 1.3 $mAh/cm^2$ of the electric current amount was generated and stored inside of the measuring tub. When extracting the electric power using the stored hydrogen on the condition of 10 $mA/cm^2$ of the constant current mode, the initial voltage in the utilization as fuel cell was 1.4 V, and, finally 1.2 mAh(s)/cell of the electric current amount was allowed to be obtained as shown in FIG. 15. Moreover, when extracting the electric current with 10 $mA/cm^2$ of the current density, the electromotive force began to be reduced due to the polarization phenomenon, and was held approximately constant around 0.7 V. Therefore, the operation voltage is suitably 0.7 V for generating power in the cell at 10 $mA/cm^2$. Devices requiring high voltage can operate by connecting the cell in series.

Obviously from Examples 4 and 5, in the method for producing hydrogen and apparatus according to the invention, the fullerene derivative such as the fullerenol was used as the proton conductor, so it was possible to efficiently produce hydrogen without humidifier or dehumidifier even in the air with the low humidity state, and to generate electric power using the generated hydrogen.

Obviously from the mentioned above, according to the apparatus for producing hydrogen and the method for producing hydrogen of the invention, the proton conductor, which has a structure containing a carbon material which is at least one kind selected from the group consisting of the fullerenes, the carbon clusters, and the linear carbon structures where a proton ($H^+$) dissociating group is introduced into at least a part of carbon atoms, is located between the anode and the cathode, so the proton conductor functions even in the low humidity atmosphere, and thus no humidifier is required, and the early initial operation at the time of hydrogen producing is possible without taking long time to start the steady operation. Moreover, only hydrogen ($H_2$) is generated from the protons ($H^+$) conducted from the anode to the cathode through the proton conductor, so no dehumidifier is required and only hydrogen can be obtained. Therefore, the apparatus itself can become compact and produce hydrogen efficiently.

Moreover, according to the electrochemistry device and the method for generating electrochemistry energy of the invention, the constitution thereof is like the apparatus for producing hydrogen of the invention, so operating in the low humidity atmosphere is possible. Therefore, neither humidifier nor dehumidifier is required, producing hydrogen and generating electrochemistry energy can be performed efficiently.

Obviously many modifications and variations of the present invention are possible in the light of the above description. It is therefore to be understood that within the scope of the appended claims the invention may be practiced otherwise than as specifically described.

The invention claimed is:

1. An apparatus for producing hydrogen comprising:
   an anode and a cathode which are placed in the opposite direction; and
   a proton conductor which is located between the anode and the cathode and has a structure containing a carbon material that is at least one kind selected from the group consisting of fullerenes, carbon clusters, and linear carbon structures where a proton (H+) dissociating group is introduced into at least a part of carbon atoms; wherein:
   hydrogen generated at the cathode is held or stored with being sealed.

2. An apparatus for producing hydrogen according to claim 1, wherein the anode has a surface on the far side from the cathode, which is placed in contact with water vapor or water vapor-containing air.

3. An apparatus for producing hydrogen according to claim 1, wherein the cathode is porous or a mesh shape.

4. An apparatus for producing hydrogen according to claim 1, wherein a catalyst layer is located between the proton conductor and either the anode or the cathode.

5. An apparatus for producing hydrogen according to claim 1, wherein a porous separator is located between the proton conductor and either the anode or the cathode.

6. An apparatus for producing hydrogen according to claim 1, wherein water in a vapor or gas state supplied to the anode has a partial pressure set within a range of 267 Pa–267 kPa.

7. An apparatus for producing hydrogen according to claim 1, wherein a temperature for electrolysis is set within a range of −50 to 300° C.

8. An apparatus for producing hydrogen according to claim 1, wherein the proton dissociating group is —XH (X is any atom or atomic group which has divalent valence number and H is a hydrogen atoms).

9. An apparatus for producing hydrogen according to claim 8, wherein the proton dissociating group is —OH or —YOH (Y is any atom or atomic group which has divalent valence number).

10. An apparatus for producing hydrogen according to claim 9, wherein the proton dissociating group is selected from the group consisting of —OH, —OSO$_3$H, —COOH, —SO$_3$H, and —OPO(OH)$_2$.

11. An apparatus for producing hydrogen according to claim 1, wherein the fullerene is a spherical-shell-like carbon cluster Cm (m is natural number expressing carbon atom numbers to form the spherical-shell structure).

12. An electrochemistry device using a reversible reaction of decomposition and generation of water and hydrogen comprising:
    an anode and a cathode which are placed in the opposite direction; and
    a proton conductor which is located between the anode and the cathode and has a structure containing a carbon material which is at least one kind selected from the group consisting of fullerenes, carbon clusters, and linear carbon structures where a proton (H+) dissociating group is introduced into at least a part of carbon atoms; wherein:
    hydrogen generated at the cathode is held or stored with being sealed.

13. An electrochemistry device according to claim 12, wherein the device is a fuel cell.

14. An electrochemistry device according to claim 12, wherein the anode has a surface on the far side from the cathode, which is placed in contact with water vapor or water vapor-containing air.

15. An electrochemistry device according to claim 12, wherein the cathode is porous or mesh shape.

16. An electrochemistry device according to claim 12, wherein a catalyst layer is located between the proton conductor and either the anode or the cathode.

17. An electrochemistry device according to claim 12, wherein a porous separator is located between the proton conductor and either the anode or the cathode.

18. An electrochemistry device according to claim 12, wherein water in a vapor or gas state supplied to the anode has a partial pressure set within a range of 267 Pa–267 kPa.

19. An electrochemistry device according to claim 12, wherein a temperature for electrolysis is set within a range of −50 to 300° C.

20. An electrochemistry device according to claim 12, wherein the proton dissociating group is —XH (X is any atom or atomic group which has divalent valence number and H is a hydrogen atoms).

21. An electrochemistry device according to claim 20, wherein the proton dissociating group is —OH or —YOH (Y is any atom or atomic group which has divalent valence number).

22. An electrochemistry device according to claim 21, wherein the proton dissociating group is selected from the group consisting of —OH, —OSO$_3$H, —COOH, —SO$_3$H, and —OPO(OH)$_2$.

23. An electrochemistry device according to claim 12, wherein the fullerene is a spherical-shell-like carbon cluster Cm (m is natural number expressing carbon atom numbers to form the spherical-shell structure).

24. A method for producing hydrogen using an apparatus for producing hydrogen comprising an anode and a cathode which are placed in the opposite direction, and a proton conductor which is located between the anode and the cathode has a structure containing a carbon material which is at least one kind selected from the group consisting of fullerenes, carbon clusters, and linear carbon structures where a proton (H+) dissociating group is introduced into at least a part of carbon atoms comprising the step of;
    supplying water in a gaseous state or a vapor state from at least one surface of the anode, electrolyzing water at the anode to produce protons (H+), conducting the protons (H+) from the anode to the cathode through the proton conductor, and converting the protons (H+) to hydrogen at the cathode; wherein:
    hydrogen generated at the cathode is held or stored with being sealed.

25. A method for producing hydrogen according to claim 24, wherein a surface of the anode on the far side from the cathode contacts water vapor or water vapor-containing air.

26. A method for producing hydrogen according to claim 24, wherein water is supplied to the anode in a vapor or gas state in 267 Pa–267 kPa of partial pressure.

27. A method for producing hydrogen according to claim 24, wherein the electrolyzing is performed in a temperature range of −50 to 300° C.

28. A method for generating electrochemistry energy using an electrochemistry device comprising an anode and a cathode which are placed in the opposite direction, and a proton conductor which is located between the anode and the cathode has a structure containing a carbon material which is at least one kind selected from the group consisting of fullerenes, carbon clusters, and linear carbon structures where a proton (H+) dissociating group is introduced into at least a part of carbon atoms comprising the steps of:

supplying water in a gaseous state or a vapor state from at least one surface of the anode, electrolyzing water at the anode to produce protons (H+), conducting the protons (H+) from the anode to the cathode through the proton conductor, and producing hydrogen from the protons (H+) at the cathode; and decomposing hydrogen at the cathode to produce protons (H+), conducting the protons (H+) from the cathode to the anode through the proton conductor, and producing water from the protons (H+) at the anode; wherein:

hydrogen generated at the cathode is held or stored with being sealed.

29. A method for generating electrochemistry energy according to claim 28, wherein a surface of the anode on the far side from the cathode contacts water vapor or water vapor-containing air.

30. A method for generating electrochemistry energy according to claim 28, wherein water is supplied in a vapor or gas state in 267 Pa–267 kPa of partial pressure.

31. A method for generating electrochemistry energy according to claim 28, wherein the electrolyzing is performed in a temperature range of −50 to 300° C.

* * * * *